US012739875B2

(12) United States Patent
Li et al.

(10) Patent No.: US 12,739,875 B2
(45) Date of Patent: Sep. 15, 2026

(54) DATA TRANSMISSION METHOD AND APPARATUS, AND STORAGE MEDIUM

(71) Applicant: ZTE CORPORATION, Shenzhen (CN)

(72) Inventors: Nan Li, Shenzhen (CN); Dan Yang, Shenzhen (CN); Zhiqiang Han, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 492 days.

(21) Appl. No.: 17/792,110

(22) PCT Filed: Feb. 18, 2021

(86) PCT No.: PCT/CN2021/076706
§ 371 (c)(1),
(2) Date: Jul. 11, 2022

(87) PCT Pub. No.: WO2021/169836
PCT Pub. Date: Sep. 2, 2021

(65) Prior Publication Data
US 2023/0047526 A1 Feb. 16, 2023

(30) Foreign Application Priority Data
Feb. 28, 2020 (CN) ......................... 202010130153.3

(51) Int. Cl.
*H04W 74/0808* (2024.01)
*H04L 5/00* (2006.01)

(52) U.S. Cl.
CPC ....... *H04W 74/0808* (2013.01); *H04L 5/0062* (2013.01)

(58) Field of Classification Search
CPC ......... H04W 74/0816; H04W 74/0841; H04W 74/085; H04L 5/0053
See application file for complete search history.

(56) References Cited

U.S. PATENT DOCUMENTS

| | | | |
|---|---|---|---|
| 9,854,607 | B1 | 12/2017 | Chu et al. |
| 2005/0162304 | A1 | 7/2005 | Mitsugi |

(Continued)

FOREIGN PATENT DOCUMENTS

| | | | |
|---|---|---|---|
| CN | 101938342 A | 1/2011 | |
| CN | 104125610 A | 10/2014 | |

(Continued)

OTHER PUBLICATIONS

International Search Report for Application No. PCT/CN2021/076706, dated May 6, 2021, 4 pages including English translation.

(Continued)

*Primary Examiner* — Derrick W Ferris
*Assistant Examiner* — Won Jun Choi
(74) *Attorney, Agent, or Firm* — Morgan, Lewis & Bockius LLP

(57) ABSTRACT

Provided are a data transmission method and apparatus and a storage medium. The data transmission method includes that a first communication node succeeds in channel contention on a first channel; the first communication node performs channel detection on a second channel within the preset duration before the sending moment of the first channel to acquire a detection result; and the first communication node sends a notification frame to a second communication node on the second channel in response to the detection result being idle, where the notification frame is used for instructing the second communication node not to send data on the second channel.

12 Claims, 6 Drawing Sheets

(56) References Cited

U.S. PATENT DOCUMENTS

| | | | | |
|---|---|---|---|---|
| 2010/0097935 | A1 | 4/2010 | Belmonte et al. | |
| 2013/0100814 | A1* | 4/2013 | Kennedy | H04W 72/1215 370/329 |
| 2013/0148615 | A1* | 6/2013 | Li | H04W 74/0816 370/329 |
| 2018/0184453 | A1* | 6/2018 | Viger | H04W 74/085 |
| 2018/0376486 | A1* | 12/2018 | Ahn | H04W 72/121 |
| 2020/0100288 | A1* | 3/2020 | Liu | H04W 74/006 |
| 2022/0210829 | A1* | 6/2022 | Kim | H04W 4/46 |
| 2022/0225373 | A1* | 7/2022 | Li | H04W 72/0453 |
| 2022/0338285 | A1* | 10/2022 | Zhou | H04W 76/15 |
| 2022/0346166 | A1* | 10/2022 | Guo | H04L 45/245 |

FOREIGN PATENT DOCUMENTS

| | | | | |
|---|---|---|---|---|
| CN | 104235610 A | | 10/2014 | |
| CN | 106664719 A | | 5/2017 | |
| CN | 106793096 A | | 5/2017 | |
| CN | 107302774 A | | 10/2017 | |
| CN | 108668344 A | | 10/2018 | |
| CN | 109995495 A | | 7/2019 | |
| JP | 2017514350 A | | 6/2017 | |
| KR | 20180050807 A | * | 5/2018 | H04W 74/002 |
| KR | 1020180050807 A | * | 5/2018 | H04W 74/002 |
| WO | WO-2005006660 A1 | | 1/2005 | |
| WO | WO-2017212807 A1 | | 12/2017 | |

OTHER PUBLICATIONS

Extended European Search Report for Application No. 21761553.3, dated Dec. 4, 2023, 9 pages.

Li et al., "Discussion about single and multiple primary links in synchronous multi-link", IEEE 802.11-19/1993r1, dated Nov. 6, 2019, 11 pages.

Ahn et al., "Considerations on Quiet Time Period", IEEE 802.11-16/1459r0, dated Nov. 6, 2016, 9 pages.

Seok et al., "Multi-Link Operation Simulation Methodology", IEEE 802.11-19/1927r1, dated Jan. 30, 2020, 23 pages.

Chinese Office Action for Application No. 2020101301533, dated Aug. 3, 2023, 27 pages including English translation.

Chinese Search Report for Application No. 2020101301533, dated Jul. 31, 2023, 9 pages including English translation.

Japanese Office Action for Application No. 2022-543132, dated Jun. 15, 2023, 9 pages including English translation.

Zhou et al., "Simultaneous Tx/Rx Capability indication for multi-link operation", IEEE 802.11-19/15550r0, dated Sep. 2019, 10 pages.

Naribole et al., "Multi-link Channel Access Discussion", IEEE 802.11-19/1405r2, dated Oct. 31, 2019, 18 pages.

* cited by examiner

DATA TRANSMISSION METHOD AND APPARATUS, AND STORAGE MEDIUM

CROSS-REFERENCES TO RELATED APPLICATIONS

This application is a national stage application filed under 35 U.S.C. 371 based on International Patent Application No. PCT/CN2021/076706, filed on Feb. 18, 2021, which claims priority to Chinese Patent Application No. 202010130153.3 filed with the China National Intellectual Property Administration (CNIPA) on Feb. 28, 2020, the disclosures of which are incorporated herein by reference in their entireties.

TECHNICAL FIELD

The present application relates to wireless communication networks, for example, a data transmission method and apparatus and a storage medium.

BACKGROUND

In the field of wireless networks, wireless local area networks (WLANs) are developing rapidly. In a WLAN, the major devices are stations that are classified into access points (APs) and non-AP stations (STAs). In general, an AP establishes one basic service set (BSS), and an STA associates and communicates with one AP through such processes as scanning, authentication and association. In a WLAN, an STA associates with only one AP at any time. The STA communicates with the associated AP or communicates with other STAs through the associated AP. The STA may also establish direct communication after the association is performed, so that the STA communicates, not through the associated AP, with other STAs associated with the associated AP. In another type of wireless local network, for example, an independent basic service set (IBSS), there is no AP, and each STA can directly communicate with other STAs within the communication range of the each STA.

With the development of wireless network technologies, AP devices and STA devices that support a multi-channel function have emerged. A channel may be also called a link. One channel may be construed as one wireless medium path for transmission of data packets. One channel generally corresponds to one wireless channel. The multi-channel function refers to that an AP device or an STA device may operate on one or more channels in unlicensed frequency bands including 2.4 GHZ, 5 GHZ, 6 GHz and below 1 GHz simultaneously or non-simultaneously. One AP device includes multiple APs. One STA device includes multiple STAs. Each AP or each STA operates on one of the preceding channels. FIG. 1 is a diagram of channels on which an AP device and an STA device operate. As shown in FIG. 1, the AP device includes three APs that operate on channel 1, channel 2 and channel 3 respectively, and an STA device includes three STAs that operate on channel 1, channel 2 and channel 3 respectively and communicate with AP1, AP2 and AP3 respectively. FIG. 2 is another diagram of channels on which an AP device and an STA device operate. As shown in FIG. 2, the AP device may operate on channel 1, channel 2 and channel 3. With regard to the STA device and the AP device as shown in FIG. 2, in some cases, a set of channels on which the STA device operates is a subset of a set of channels on which the AP device operates, that is, the STA device may operate on channel 2 and channel 3.

Regardless of the AP device or the STA device, when the frequency interval between two channels of the same device is insufficient, one of the two channels starts to receive data, and, in the meantime, the other one of the two channels sends data, resulting in self-interference between the two channels.

As shown in FIG. 2, it is assumed that data cannot be received and sent on channel 1 and channel 2 of the AP device simultaneously due to the insufficient frequency interval between the two channels. In other words, when sending data on channel 1, the AP device cannot receive data through channel 2. If the AP device sends downlink data on channel 1, and the STA device is not operating on channel 1 and thus does not monitor channel 1, then the STA device may start to send uplink data to the AP device on channel 2, resulting in interference between the two channels of the AP device.

SUMMARY

The present application provides a data transmission method and apparatus and a storage medium to solve the technical problem of interference between two channels of a communication node caused by a transmission mode.

Embodiments of the present application provide a data transmission method. The method includes the steps below.

A first communication node succeeds in channel contention on a first channel.

The first communication node performs channel detection on a second channel within a preset duration before a sending moment of the first channel to acquire a detection result.

The first communication node sends a notification frame to a second communication node on the second channel in response to the detection result being idle, where the notification frame is used for instructing the second communication node not to send data on the second channel.

Embodiments of the present application provide a data transmission method. The method includes the steps below.

On a second channel, a second communication node receives a notification frame sent by a first communication node, where the notification frame is used for instructing the second communication node not to send data on the second channel.

The second communication node determines not to send data on the second channel according to the notification frame.

Embodiments of the present application provide a data transmission apparatus. The apparatus includes a processor.

The processor is configured to perform the data transmission method of any one of the preceding embodiments when executing a computer program.

Embodiments of the present application provide a storage medium storing a computer program. When executed by a processor, the computer program causes the processor to perform any data transmission method in the embodiments of the present application.

DETAILED DESCRIPTION

Embodiments of the present application are described hereinafter in detail in conjunction with drawings. It is to be noted that if not in collision, embodiments of the present application and features therein may be combined with each other in any manner.

Figure 1:
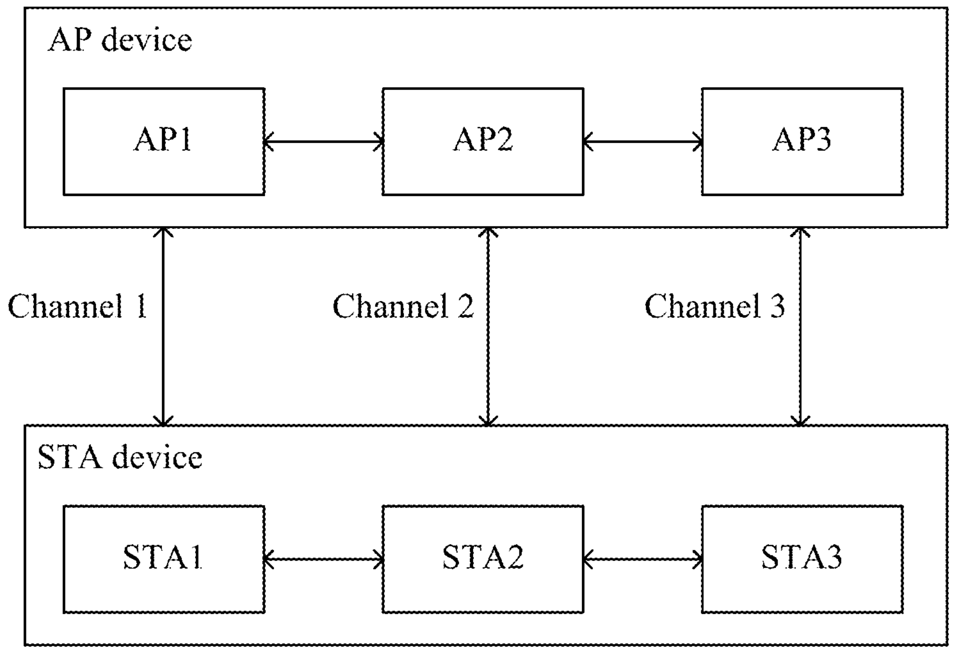
FIG. 1 is a diagram of channels on which an AP device and an STA device operate.
Figure 2:
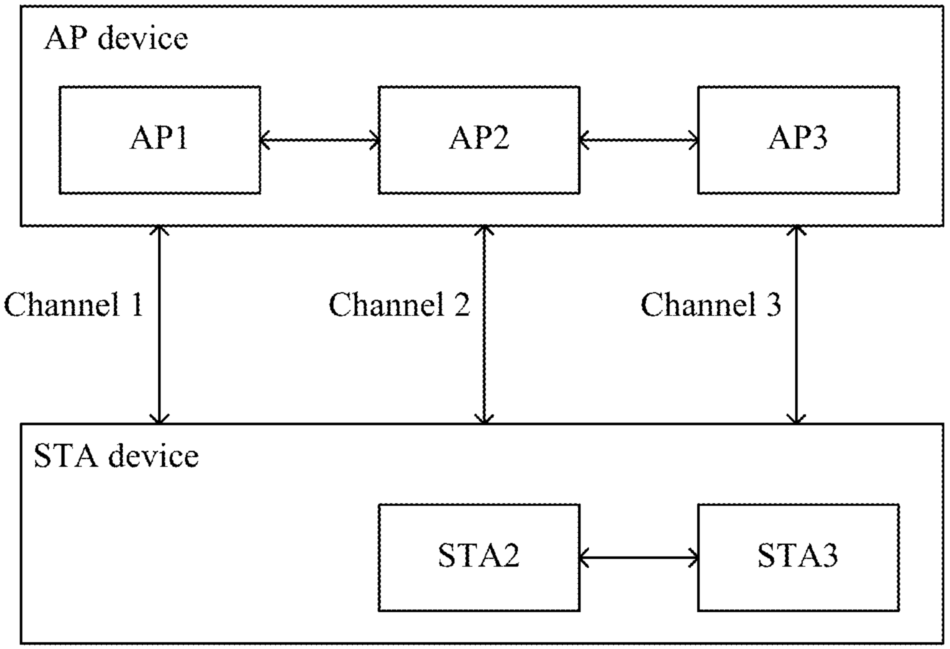
FIG. 2 is another diagram of channels on which an AP device and an STA device operate.
Figure 3:
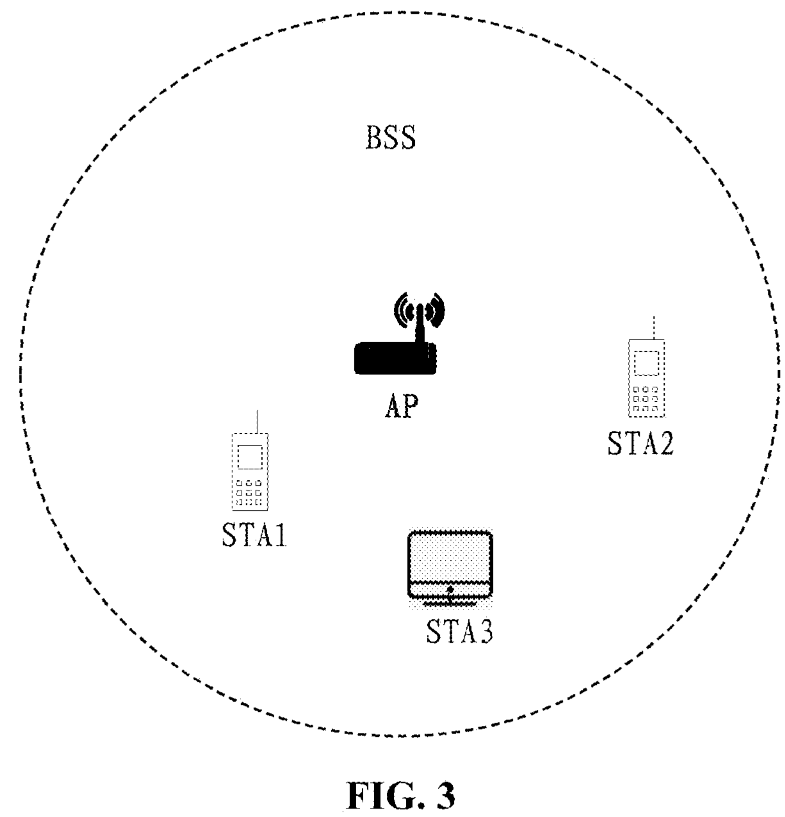
FIG. 3 is a diagram illustrating the structure of a basic service set.

FIG. 3 is a diagram illustrating the structure of a basic service set. As shown in FIG. 3, one AP device and multiple STA devices associated with the one AP device form one BSS. In FIG. 3, there are three STA devices associated with the one AP device: STA1, STA2 and STA3. In the present application, the AP device supports a multi-channel function and includes multiple APs. Each AP may operate on one or more channels in unlicensed frequency bands including 2.4 GHZ, 5 GHz, 6 GHz and below 1 GHz simultaneously or non-simultaneously. In the present application, an STA device also supports a multi-channel function and includes multiple STAs, and each STA may operate on one or more of the one or more channels simultaneously or non-simultaneously. With continued reference to FIG. 2, if data cannot be received and sent on channel 1 and channel 2 of the AP device simultaneously due to the insufficient frequency interval between the two channels, when the AP device sends downlink data on channel 1, the STA device does notmonitor channel 1 and thus may send uplink data to the AP device on channel 2, resulting in interference between channel 1 and channel 2 of the AP device.

In a data transmission method provided by the present application, a first communication node conduct channel detection on a second channel before the sending moment of a successfully contended first channel to acquire a detection result, and the first communication node sends a notification frame to a second communication node on the second channel in response to the detection result being idle, where the notification frame is used for instructing the second communication not to send data on the second channel. In this manner, when the first communication node sends data on the first channel, the second communication node cannot send data on the second channel so that the first communication node can be prevented from interfering with the first channel when receiving data on the second channel, thus improving the communication reliability of the first communication node.

Figure 4:
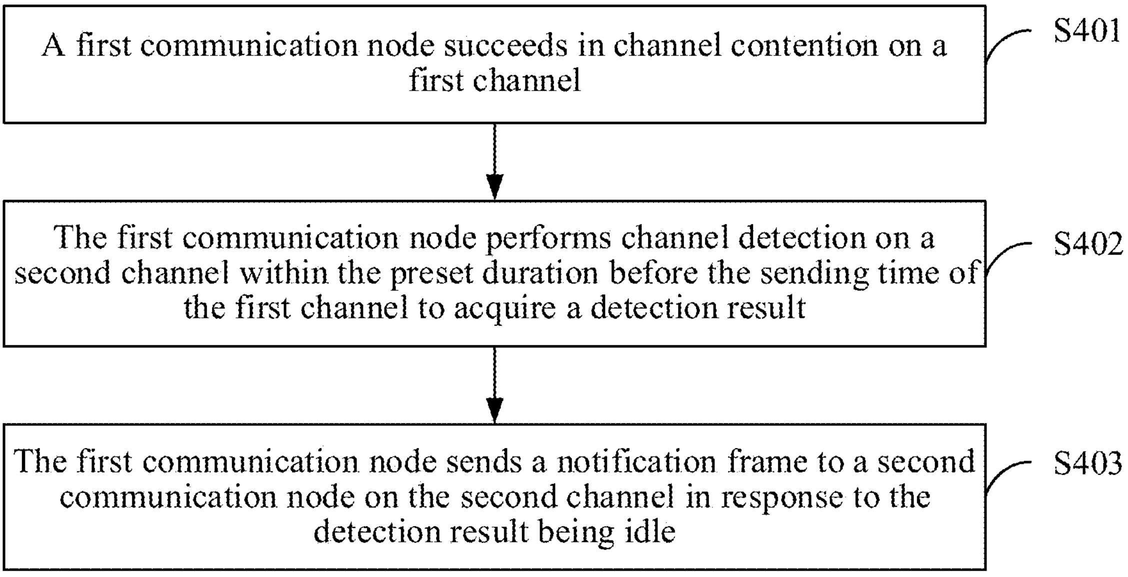
FIG. 4 is a flowchart of a data transmission method according to an embodiment.

FIG. 4 is a flowchart of a data transmission method according to an embodiment. The present embodiment describes the data transmission method from the perspective of a first communication node. As shown in FIG. 4, the data transmission method provided by the present embodiment includes the steps below.

In S401, a first communication node succeeds in channel contention on a first channel.

All communication nodes in the present embodiment are devices operating on unlicensed frequency bands. All these devices use the listen-before-talk (LBT) mechanism basically. These devices first monitor a wireless medium for a period of time before being able to send data on unlicensed frequency bands. In the present embodiment, a channel successfully contended for by the first communication node is called a first channel.

The first communication node sends data on the first channel after succeeding in channel contention. In the present embodiment, the sending moment of the first channel is denoted as t. The sending moment of the first channel refers to the moment at which the first communication node sends data on the first channel after succeeding in channel contention on the first channel.

In S402, the first communication node performs channel detection on a second channel within the preset duration before the sending moment of the first channel to acquire a detection result.

In an embodiment, the preset duration is predefined by the system.

In an embodiment, the preset duration ends at the sending moment of the first channel or before the sending moment of the first channel.

In an embodiment, the second channel refers to any channel other than the first channel among the channels of the first communication node.

In another embodiment, the second channel is such a channel among the channels of the first communication node that sending and receiving operations are not allowed to be performed on the first channel and on the second channel simultaneously. That sending and receiving operations are not allowed to be performed on the first channel and on the second channel simultaneously means that the first communication node cannot receive data through the second channel when sending data on the first channel or cannot receive data through the first channel when sending data on the second channel.

Figure 5:
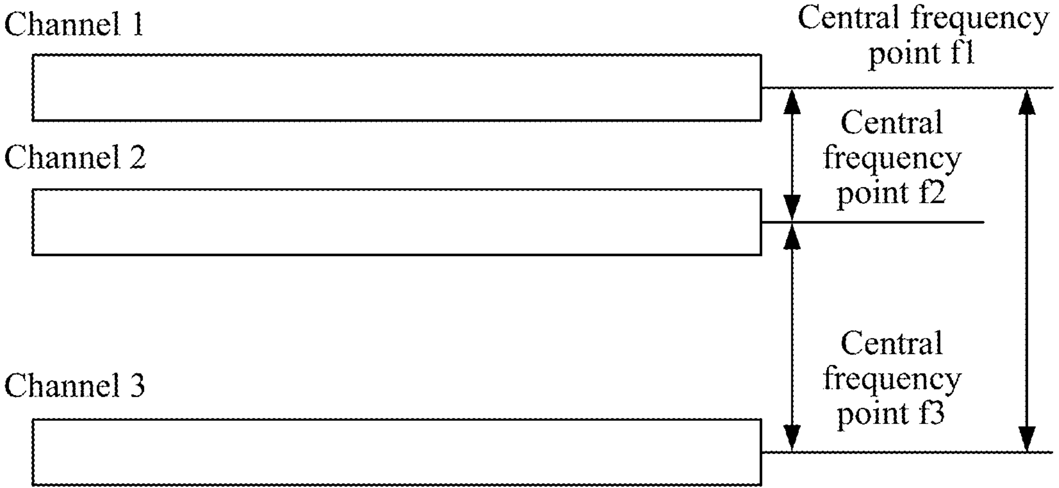
FIG. 5 is a diagram of channels on which a first communication node operates.

FIG. 5 is a diagram of channels on which a first communication node operates. As shown in FIG. 5, the first communication node may operate on channel 1, channel 2 and channel 3. The central frequency point corresponding to channel 1 is f1. The central frequency point corresponding to channel 2 is f2. The central frequency point corresponding to channel 3 is f3. Among channel 1, channel 2 and channel 3, sending and receiving operations are not allowed to be performed simultaneously on two channels whose absolute value of the difference between the corresponding central frequency points is less than the first frequency interval threshold; and sending and receiving operations are allowed to be performed simultaneously on two channels whose absolute value of the difference between the corresponding central frequency points is greater than or equal to the first frequency interval threshold. The first frequency interval threshold is used for indicating the minimum value of the absolute value of the difference between the central frequency points corresponding to such two channels among the channels of the first communication node that sending and receiving operations are allowed to be performed on the two channels simultaneously.

Figure 6A:
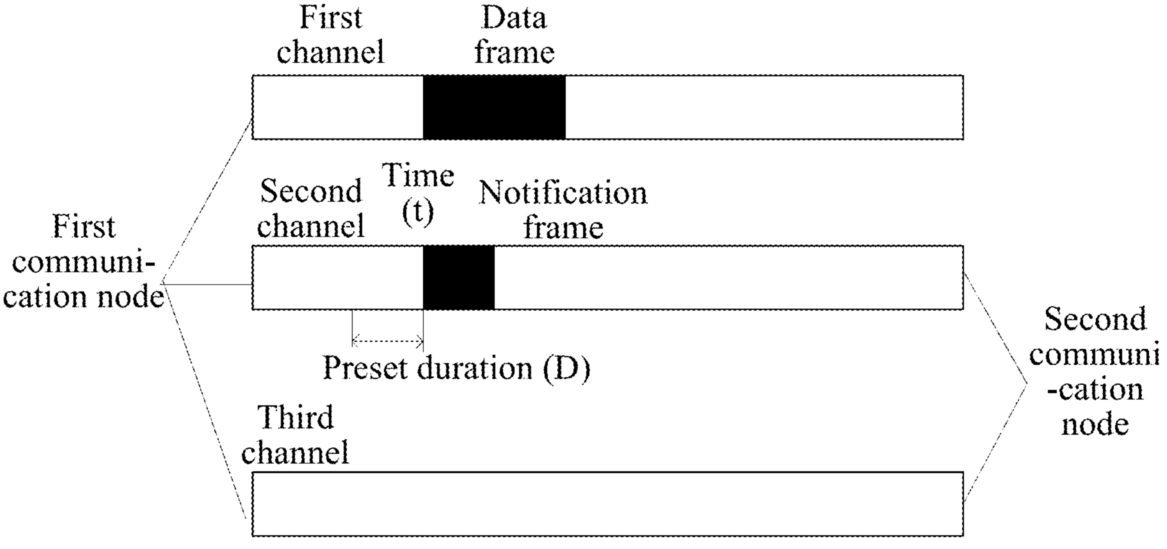
FIG. 6A is a timing diagram of channel detection performed by a first communication node on a second channel.

FIG. 6A is a timing diagram of channel detection performed by a first communication node on a second channel.

As shown in FIG. 6A, the first communication node supports operating on the first channel, the second channel and a third channel. The first communication node performs channel detection within the preset duration D before the sending moment t of the first channel. The preset duration D ends at the sending moment of the first channel.

In an embodiment, the detection result is determined to be idle in response to the first communication node determining that a result of signal intensity detection is idle on the second channel within the preset duration before the sending moment of the first channel and in response to a network allocation vector corresponding to the second channel being zero. The signal intensity detection refers to the following: The signal intensity of a signal transmitted on the second channel is acquired within the preset duration D before the moment t; and if the signal intensity is less than a preset signal intensity threshold, data transmission can be determined not to be performed on the second channel at this time, and thus the signal intensity detection result is determined to be idle.

Figure 6B:
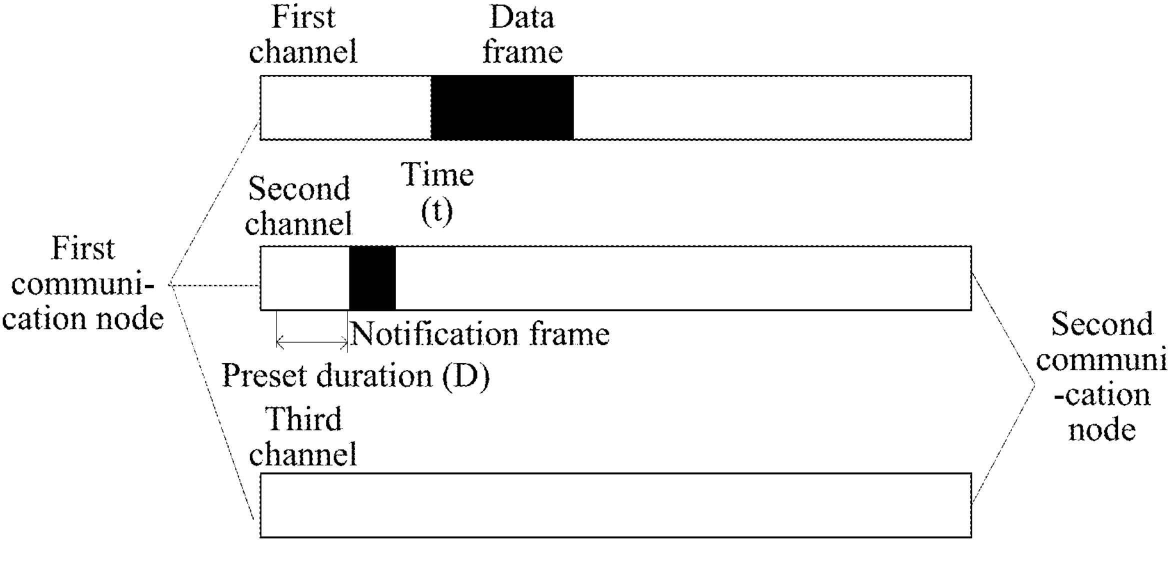
FIG. 6B is another timing diagram of channel detection performed by a first communication node on a second channel.

FIG. 6B is another timing diagram of channel detection performed by a first communication node on a second channel. The first communication node supports operating on the first channel, the second channel and the third channel. The first communication node performs channel detection within the preset duration D before the sending moment t of the first channel. The preset duration D ends before the sending moment of the first channel.

In S403, the first communication node sends a notification frame to a second communication node on the second channel in response to the detection result being idle.

The notification frame is used for instructing the second communication node not to send data on the second channel.

In an embodiment, the first communication node is an AP device, and the second communication node is an STA device associated with the first communication node. The first communication node and the second communication node form a BSS.

In another embodiment, the first communication node is an STA device, and the second communication node is an STA device associated with the first communication node. The first communication node and the second communication node form an IBSS.

In another embodiment, the second communication node is a communication node associated with the first communication node and currently not operating on the first channel. The second communication node currently not operating on the first channel refers to that the second communication node does not support operating on the first channel, or the second communication node supports operating on the first channel but is currently not operating on the first channel.

Optionally, in S403, the first communication node sends the notification frame to the second communication node on the second channel at the preset moment. The preset moment is not later than the sending moment of the first channel. In other words, the first communication node sends the notification frame to the second communication node on the second channel before sending a data frame on the first channel or when sending the data frame on the first channel.

With continued reference to FIG. 6A, the second communication node operates on the second channel and the third channel. When determining that the detection result is idle, the first communication node sends the notification frame to the second communication node on the second channel when sending the data frame on the first channel. The notification frame is used for instructing the second communication node not to send data on the second channel. After receiving the notification frame, the second communication node does not send data on the second channel according to the instruction of the notification frame.

With continued reference to FIG. 6B, the second communication node operates on the second channel and the third channel. The first communication node detects that a channel is idle within the preset duration D and sends the notification frame to the second communication node on the second channel before sending the data frame on the first channel. In the present embodiment, the first communication node sends the notification frame to the second communication node on the second channel earlier than the sending moment of the first channel. That is, the first communication node notifies the second communication node of the transmission of the first channel in advance in the case where the second channel is idle. The notification frame is used for instructing the second communication node not to send data on the second channel. After receiving the notification frame, the second communication node does not send data on the second channel according to the instruction of the notification frame.

In the case where the preset duration D ends before the sending moment of the first channel, the first communication node may also send the notification frame to the second communication node on the second channel when sending the data frame on the first channel.

In an embodiment, the notification frame includes at least one of the following: the type of the notification frame, the identifier of the first channel, the sending duration of the first communication node on the first channel, or the sending moment of the first communication node on the first channel.

The type of the notification frame is used for indicating that the notification frame is a frame notifying that the first communication node is performing sending operation. In an embodiment, the physical-layer signaling of the notification frame may be used for carrying the type of the notification frame.

In an embodiment, the identifier of the first channel includes at least one of the following: the channel number, the central frequency point corresponding to the channel, or the link number.

In response to the notification frame including the sending duration of the first communication node on the first channel, the second communication node determines not to send data on the second channel within the duration according to the notification frame. Specifically, after receiving the notification frame, the second communication node does not send data on the second channel within the preceding duration.

When the notification frame includes the sending moment of the first communication node on the first channel, and the first communication node sends the notification frame on the second channel in advance before sending the data frame on the first channel, the second communication node may determine the sending moment of the first channel according to the notification frame. In this manner, the second communication node does not send data on the second channel within the sending duration of the first channel after the sending moment.

In the data transmission method provided by the present embodiment, the first communication node succeeds in channel contention on the first channel, performs the channel detection on the second channel within the preset duration before the sending moment of the first channel to acquire the detection result and sends the notification frame to the second communication node on the second channel in response to the detection result being idle, where the notification frame is used for instructing the second communication node not to send data on the second channel. In this manner, when the first communication node sends data on the first channel, the second communication node cannot send data on the second channel so that the first communication node can be prevented from interfering with the first channel when receiving data on the second channel, thus improving the communication reliability of the first communication node.

In an embodiment, to prevent too large overhead caused by enumeration by the first communication node to notify the second communication node of channels on which sending and receiving operations are not allowed to be performed simultaneously (or channels on which sending and receiving operations are allowed to be performed simultaneously), where the notified channels are among the channels supported by the first communication node, in the present embodiment, before step 401 is performed, the first communication node sends the first multi-channel capability parameter to the second communication node. The first multi-channel capability parameter includes at least the first frequency interval threshold.

Optionally, the first multi-channel capability parameter may further include at least one of the following: the working frequency bands of the channels supported by the first communication node, the central frequency points corresponding to the channels, the bandwidths of the channels, or whether to support simultaneous multi-channel sending and receiving.

As shown in the preceding, the first frequency interval threshold is used for indicating the minimum value of the absolute value of the difference between the central frequency points corresponding to such two channels among the channels of the first communication node that sending and receiving operations are allowed to be performed on the two channels simultaneously.

After receiving the first multi-channel capability parameter, the second communication node determines such channels among the channels of the first communication node that sending and receiving operations are not allowed to be performed simultaneously on the channels (or that sending and receiving operations are allowed to be performed simultaneously on the channels) according to the first frequency interval threshold. The specific process is the following: The second communication node determines such two channels among the channels of the first communication node that the absolute value of the difference between the corresponding central frequency points is less than the first frequency interval threshold as such channels among the channels of the first communication node that sending and receiving operations are not allowed to be performed simultaneously on the channels; and the second communication node determines such two channels among the channels of the first communication node that the absolute value of the difference between the corresponding central frequency points is greater than or equal to the first frequency interval threshold as such channels among the channels of the first communication node that sending and receiving operations are allowed to be performed simultaneously on the channels.

In the present embodiment, the first communication node sends the first multi-channel capability parameter to the second communication node, where the first multi-channel capability parameter includes at least the first frequency interval threshold. In this manner, the first communication node can indicate the minimum value of the absolute value of the difference between the central frequency points corresponding to such two channels among the channels of the first communication node that sending and receiving operations can be performed simultaneously on the two channels to the second communication node through the first frequency interval threshold so that the second communication node can determine such channels among the channels of the first communication node that sending and receiving operations can be performed simultaneously on the channels or that sending and receiving operations cannot be performed simultaneously on the channels according to the first frequency interval threshold, thus preventing too large overhead caused by enumeration to notify the second communication node.

In an embodiment, the hardware performances of the first communication node and the second communication node are different, so the minimum value of the absolute value of the difference between the central frequency points corresponding to such two channels among the channels of the first communication node that sending and receiving operations are allowed to be performed simultaneously on the two channels is different from the minimum value of the absolute value of the difference between the central frequency points corresponding to such two channels among the channels of the second communication node that sending and receiving operations are allowed to be performed simultaneously on the two channels. To let the first communication node know such channels among the channels of the second communication node that sending and receiving operations are allowed to be performed simultaneously on the channels or that sending and receiving operations are not allowed to be performed simultaneously on the channels, and to prevent the second communication node from notifying the first communication node in an enumeration manner, in the present embodiment, the second communication node needs to send the second multi-channel capability parameter to the first communication node. The second multi-channel capability parameter includes at least the second frequency interval threshold. Accordingly, the first communication node receives the second multi-channel capability parameter sent by the second communication node before step 401.

The second frequency interval threshold is used for indicating the minimum value of the absolute value of the difference between the central frequency points corresponding to such two channels among the channels of the second communication node that sending and receiving operations are allowed to be performed simultaneously on the two channels. Sending and receiving operations are not allowed to be performed simultaneously on such two channels among the channels of the second communication node that the absolute value of the difference between the central frequency points corresponding to the two channels is less than the second frequency interval threshold; and sending and receiving operations are allowed to be performed simultaneously on such two channels among the channels of the second communication node that the absolute value of the difference between the central frequency points corresponding to the two channels is greater than or equal to the second frequency interval threshold.

Optionally, the second multi-channel capability parameter may further include at least one of the following: the working frequency bands of the channels supported by the second communication node, the central frequency points corresponding to the channels, the bandwidths of the channels, or whether to support simultaneous multi-channel sending and receiving.

After receiving the second multi-channel capability parameter, the first communication node determines such channels among the channels of the second communication node that sending and receiving operations are not allowed to be performed simultaneously on the channels (or that sending and receiving operations are allowed to be performed simultaneously on the channels) according to the second frequency interval threshold. The specific process is the following: The first communication node determines such two channels among the channels of the second communication node that the absolute value of the difference between the corresponding central frequency points is less than the second frequency interval threshold as such channels among the channels of the second communication node that sending and receiving operations are not allowed to be performed simultaneously on the channels; and the first communication node determines such two channels among the channels of the second communication node that the absolute value of the difference between the corresponding central frequency points is greater than or equal to the second frequency interval threshold as such channels among the channels of the second communication node that sending and receiving operations are allowed to be performed simultaneously on the channels.

In the present embodiment, the first communication node receives the second multi-channel capability parameter sent by the second communication node, where the second multi-channel capability parameter includes at least the second frequency interval threshold. In this manner, the second communication node can indicate the minimum value of the absolute value of the difference between the central frequency points corresponding to such two channels among the channels of the second communication node that sending and receiving operations can be performed simultaneously on the two channels to the first communication node through the second frequency interval threshold so that the first communication node can determine such channels among the channels of the second communication node that sending and receiving operations can be performed simultaneously on the channels or that sending and receiving operations cannot be performed simultaneously on the channels according to the second frequency interval threshold, thus preventing too large overhead caused by enumeration to notify the first communication node.

Figure 7:
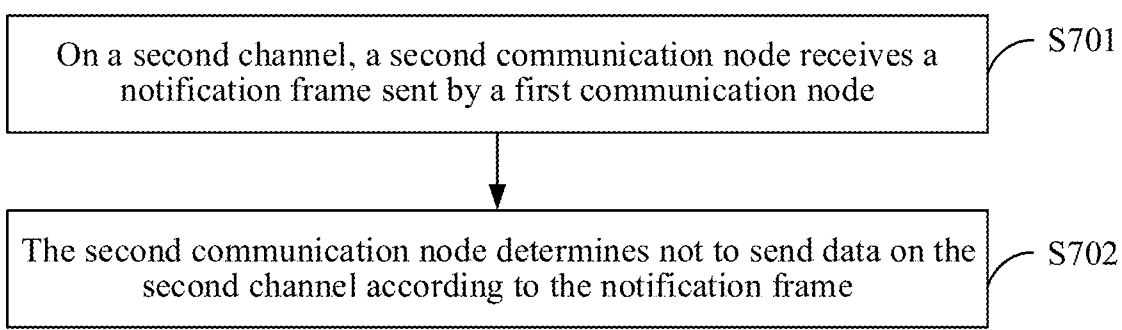
FIG. 7 is a flowchart of a data transmission method according to another embodiment.

FIG. 7 is a flowchart of a data transmission method according to another embodiment. The present embodiment describes the data transmission method from the perspective of a second communication node. As shown in FIG. 7, the data transmission method provided by the present embodiment includes the steps below.

In S701, on a second channel, a second communication node receives a notification frame sent by a first communication node.

The notification frame is used for instructing the second communication node not to send data on the second channel.

In an embodiment, the notification frame includes at least one of the following: the type of the notification frame, the identifier of the first channel, the sending duration of the first communication node on a first channel, or the sending moment of the first communication node on the first channel.

The type of the notification frame is used for indicating that the notification frame is a frame notifying the first communication node of sending being performed. In an embodiment, the physical-layer signaling of the notification frame may be used for carrying the type of the notification frame.

The second communication node receives the notification frame and determines the sender as the first communication node according to the identifier of the sender carried by the notification frame. Determined by the type of the frame, the frame is used for notifying that the first communication node is performing sending on a certain channel.

In an embodiment, the identifier of the first channel includes at least one of the following: the channel number, the central frequency point corresponding to the channel or the link number. The second communication node determines, through the identifier of the first channel, that the first communication node is performing sending on the first channel.

In an embodiment, the first communication node sends the notification frame to the second communication node when or before sending a data frame on the first channel. That is, the sending moment of the notification frame is not later than the sending moment of the first channel.

In S702, the second communication node determines not to send data on the second channel according to the notification frame.

In response to the notification frame including the sending duration of the first communication node on the first channel, the second communication node determines not to send data on the second channel within the duration according to the notification frame. In another embodiment, when the type of a read frame is a frame notifying that the first communication node is performing sending, the duration calculated by parameters in the physical-layer signaling is the sending duration of the first communication node on the first channel.

When the notification frame includes the sending moment of the first communication node on the first channel, the second communication node may determine the sending moment of the first channel and does not send data on the second channel after the sending moment.

In an embodiment, the second channel is such a channel among the channels of the first communication node that sending and receiving operations are not allowed to be performed on the first channel and on the second channel simultaneously.

In an embodiment, the second communication node configures its virtual carrier vector according to the sending duration of the first communication on the first channel and does not perform channel contention within the duration.

In an embodiment, the second communication node is a communication node associated with the first communication node and currently not operating on the first channel.

In the data transmission method provided by the present embodiment, when the first communication node sends data on the first channel, the second communication node cannot send data on the second channel so that the first communication node can be prevented from interfering with the first channel when receiving data on the second channel, thus improving the communication reliability of the first communication node.

In an embodiment, the second communication node receives the first multi-channel capability parameter sent by the first communication node before step 701. The first multi-channel capability parameter includes at least the first frequency interval threshold.

Optionally, the first multi-channel capability parameter may further include at least one of the following: the working frequency bands of the channels supported by the first communication node, the central frequency points corresponding to the channels, the bandwidths of the channels, or whether to support simultaneous multi-channel sending and receiving.

The first frequency interval threshold is used for indicating the minimum value of the absolute value of the difference between the central frequency points corresponding to such two channels among the channels of the first communication node that sending and receiving operations are allowed to be performed simultaneously on the two channels. Sending and receiving operations are not allowed to be performed simultaneously on such two channels among the channels of the first communication node that the absolute value of the difference between the central frequency points corresponding to the two channels is less than the first frequency interval threshold; and sending and receiving operations are allowed to be performed simultaneously on such two channels among the channels of the first communication node that the absolute value of the difference between the central frequency points corresponding to the two channels is greater than or equal to the first frequency interval threshold.

After receiving the first multi-channel capability parameter, the second communication node determines such channels among the channels of the first communication node that sending and receiving operations are not allowed to be performed simultaneously on the channels (or that sending and receiving operations are allowed to be performed simultaneously on the channels) according to the first frequency interval threshold. The specific process is the following: The second communication node determines such two channels among the channels of the first communication node that the absolute value of the difference between the corresponding central frequency points is less than the first frequency interval threshold as such channels among the channels of the first communication node that sending and receiving operations are not allowed to be performed simultaneously on the channels; and the second communication node determines such two channels among the channels of the first communication node that the absolute value of the difference between the corresponding central frequency points is greater than or equal to the first frequency interval threshold as such channels among the channels of the first communication node that sending and receiving operations are allowed to be performed simultaneously on the channels.

In the present embodiment, the second communication node can determine such channels among the channels of the first communication node that sending and receiving operations can be performed simultaneously on the channels or that sending and receiving operations cannot be performed simultaneously on the channels according to the first frequency interval threshold, thus preventing too large overhead caused by enumeration by the first communication node to notify the second communication node.

In an embodiment, the second communication node sends the second multi-channel capability parameter to the first communication node before step 701. The second multi-channel capability parameter includes at least the second frequency interval threshold.

The second frequency interval threshold is used for indicating the minimum value of the absolute value of the difference between the central frequency points corresponding to such two channels among the channels of the second communication node that sending and receiving operations are allowed to be performed simultaneously on the two channels. Sending and receiving operations are not allowed to be performed simultaneously on such two channels among the channels of the second communication node that the absolute value of the difference between the central frequency points corresponding to the two channels is less than the second frequency interval threshold; and sending and receiving operations are allowed to be performed simultaneously on such two channels among the channels of the second communication node that the absolute value of the difference between the central frequency points corresponding to the two channels is greater than or equal to the second frequency interval threshold.

In the present embodiment, the second communication node can indicate the minimum value of the absolute value of the difference between the central frequency points corresponding to such two channels among the channels of the second communication node that sending and receiving operations can be performed simultaneously on the two channels to the first communication node through the second frequency interval threshold so that the first communication node can determine such channels among the channels of the second communication node that sending and receiving operations can be performed simultaneously on the channels or that sending and receiving operations cannot be performed simultaneously on the channels according to the second frequency interval threshold, thus preventing too large overhead caused by enumeration to notify the first communication node.

Figure 8:
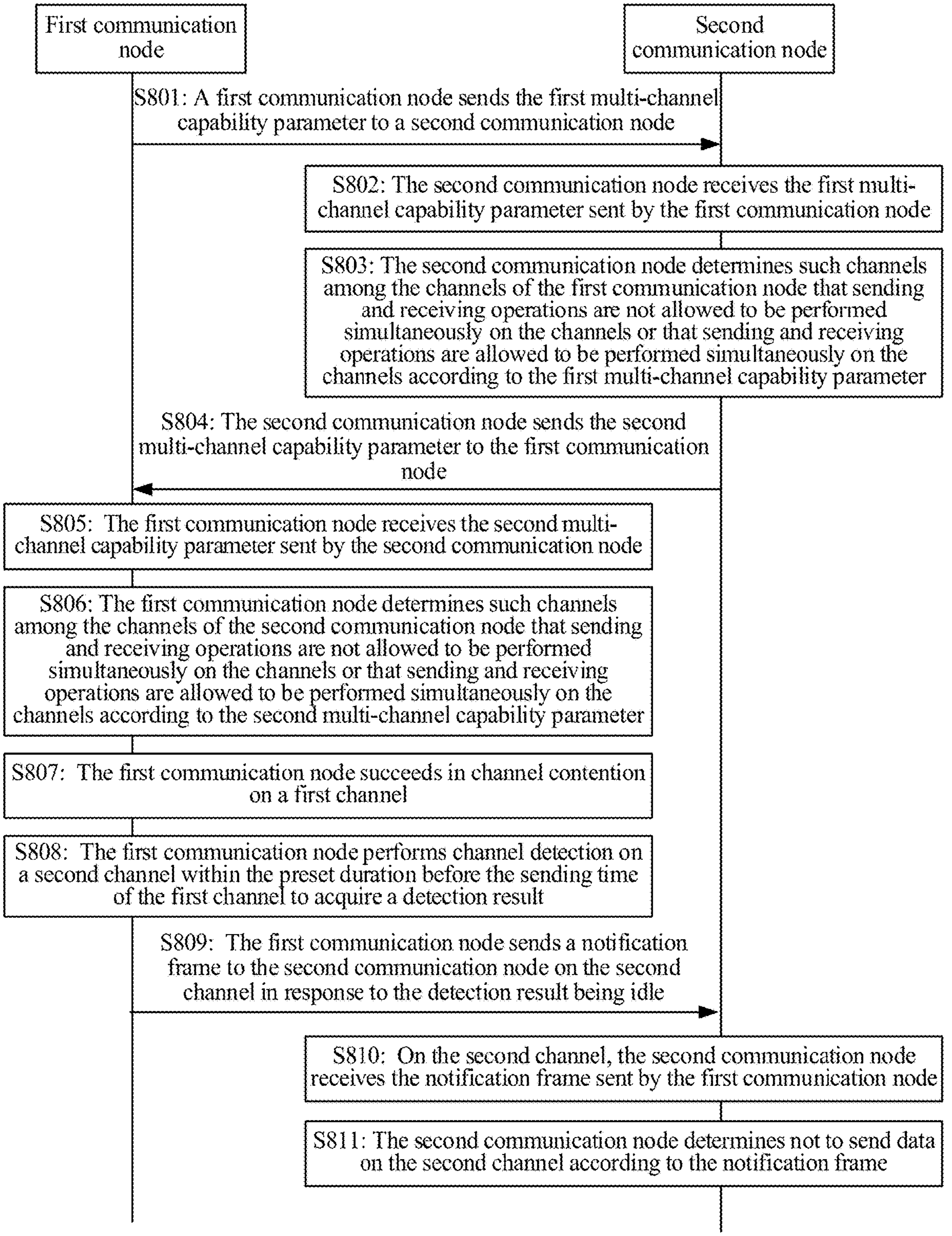
FIG. 8 is a signaling interaction diagram of a data transmission method according to an embodiment.

FIG. 8 is a signaling interaction diagram of a data transmission method according to an embodiment. The present embodiment describes the data transmission method from the perspective of the interaction between a first communication node and a second communication node. As shown in FIG. 8, the data transmission method provided by the present embodiment includes the steps below.

In S801, a first communication node sends the first multi-channel capability parameter to a second communication node.

The first multi-channel capability parameter includes at least the first frequency interval threshold.

In S802, the second communication node receives the first multi-channel capability parameter sent by the first communication node.

In S803, the second communication node determines such channels among the channels of the first communication node that sending and receiving operations are not allowed to be performed simultaneously on the channels or that sending and receiving operations are allowed to be performed simultaneously on the channels according to the first multi-channel capability parameter.

In an embodiment, the second communication node determines such two channels among the channels of the first communication node that the absolute value of the difference between the corresponding central frequency points is less than the first frequency interval threshold as such channels among the channels of the first communication node that sending and receiving operations are not allowed to be performed simultaneously on the channels; and the second communication node determines such two channels among the channels of the first communication node that the absolute value of the difference between the corresponding central frequency points is greater than or equal to the first frequency interval threshold as such channels among the channels of the first communication node that sending and receiving operations are allowed to be performed simultaneously on the channels.

In S804, the second communication node sends the second multi-channel capability parameter to the first communication node.

The second multi-channel capability parameter includes at least the second frequency interval threshold.

It is to be noted that there is no timing relationship between S804 and S801 or between S802 and S803.

In S805, the first communication node receives the second multi-channel capability parameter sent by the second communication node.

In S806, the first communication node determines such channels among the channels of the second communication node that sending and receiving operations are not allowed to be performed simultaneously on the channels or that sending and receiving operations are allowed to be performed simultaneously on the channels according to the second multi-channel capability parameter.

In an embodiment, the first communication node determines such two channels among the channels of the second communication node that the absolute value of the difference between the corresponding central frequency points is less than the second frequency interval threshold as such channels among the channels of the second communication node that sending and receiving operations are not allowed to be performed simultaneously on the channels; and the first communication node determines such two channels among the channels of the second communication node that the absolute value of the difference between the corresponding central frequency points is greater than or equal to the second frequency interval threshold as such channels among the channels of the second communication node that sending and receiving operations are allowed to be performed simultaneously on the channels.

It is to be noted that S801 to S806 are optional.

In S807, the first communication node succeeds in channel contention on a first channel.

In S808, the first communication node performs channel detection on a second channel within the preset duration before the sending moment of the first channel to acquire a detection result.

In S809, the first communication node sends a notification frame to the second communication node on the second channel in response to the detection result being idle.

The notification frame is used for instructing the second communication node not to send data on the second channel.

S807 and S401, S808 and S402, and S809 and S403 have similar implementation processes and technical principles, which are not repeated here.

In S810, on the second channel, the second communication node receives the notification frame sent by the first communication node.

In S811, the second communication node determines not to send data on the second channel according to the notification frame.

S810 and S701 and S811 and S702 have similar implementation processes and technical principles, which are not repeated here.

In the data transmission method provided by the present embodiment, on one hand, too large overhead can be prevented caused by enumeration by the first communication node and the second communication node to notify each other of channels on which sending and receiving operations cannot be performed simultaneously (or channels on which sending and receiving operations can be performed simultaneously), where the notified channels are among the channels supported by the first communication node and the second communication; on the other hand, when the first communication node sends data on the first channel, the second communication node cannot send data on the second channel so that the first communication node can be prevented from interfering with the first channel when receiving data on the second channel, thus improving the communication reliability of the first communication node.

Figure 9:
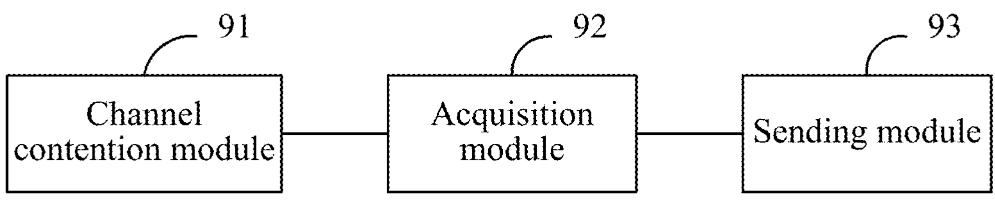
FIG. 9 is a diagram illustrating the structure of a data transmission apparatus according to an embodiment.

FIG. 9 is a diagram illustrating the structure of a data transmission apparatus according to an embodiment. The apparatus may be configured in a first communication node. As shown in FIG. 9, the data transmission apparatus provided by the present embodiment includes a channel contention module 91, an acquisition module 92 and a sending module 93.

The channel contention module 91 is configured to succeed in channel contention on a first channel.

The acquisition module 92 is configured to perform channel detection on a second channel within the preset duration before the sending moment of the first channel to acquire a detection result.

In an embodiment, the acquisition module 92 is specifically configured to determine that the detection result is idle in response to determining that a result of signal intensity detection is idle on the second channel within the preset duration before the sending moment of the first channel, and in response to a network allocation vector corresponding to the second channel being zero.

The sending module 93 is configured to send a notification frame to a second communication node on the second channel in response to the detection result being idle.

The notification frame is used for instructing the second communication node not to send data on the second channel.

In an embodiment, the notification frame includes at least one of the following: the type of the notification frame, the identifier of the first channel, the sending duration of the first communication node on the first channel, or the sending moment of the first communication node on the first channel.

In an embodiment, the identifier of the first channel includes at least one of the following: the channel number, the central frequency point corresponding to the channel, or the link number.

In an embodiment, the second channel is such a channel among the channels of the first communication node that sending and receiving operations are not allowed to be performed on the first channel and on the second channel simultaneously.

In an embodiment, the second communication node is a communication node associated with the first communication node and currently not operating on the first channel.

In an embodiment, the sending module 93 is specifically configured to send the notification frame to the second communication node on the second channel at the preset moment. The preset moment is not later than the sending moment of the first channel.

In an embodiment, the sending module 93 is further configured to send the first multi-channel capability parameter to the second communication node. The first multi-channel capability parameter includes at least the first frequency interval threshold.

In an embodiment, the first frequency interval threshold is used for indicating the minimum value of the absolute value of the difference between the central frequency points corresponding to such two channels among the channels of the first communication node that sending and receiving operations are allowed to be performed simultaneously on the two channels. Sending and receiving operations are not allowed to be performed simultaneously on such two channels among the channels of the first communication node that the absolute value of the difference between the central frequency points corresponding to the two channels is less than the first frequency interval threshold; and sending and receiving operations are allowed to be performed simultaneously on such two channels among the channels of the first communication node that the absolute value of the difference between the central frequency points corresponding to the two channels is greater than or equal to the first frequency interval threshold.

In an embodiment, the apparatus further includes a receiving module configured to receive the second multi-channel capability parameter sent by the second communication node. The second multi-channel capability parameter includes at least the second frequency interval threshold.

(0130) In an embodiment, the second frequency interval threshold is used for indicating the minimum value of the absolute value of the difference between the central frequency points corresponding to such two channels among the channels of the second communication node that sending and receiving operations are allowed to be performed simultaneously on the two channels. Sending and receiving operations are not allowed to be performed simultaneously on such two channels among the channels of the second communication node that the absolute value of the difference between the central frequency points corresponding to the two channels is less than the second frequency interval threshold; and sending and receiving operations are allowed to be performed simultaneously on such two channels among the channels of the second communication node that the absolute value of the difference between the central frequency points corresponding to the two channels is greater than or equal to the second frequency interval threshold.

The data transmission apparatus provided by the present embodiment is configured to perform the data transmission method in the embodiment shown in FIG. 4. The data transmission apparatus provided by the present embodiment has similar implementation principles and technical effects, which are not repeated here.

Figure 10:
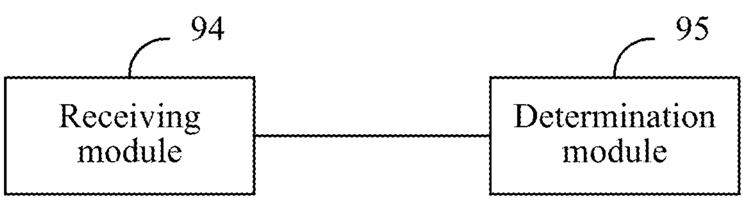
FIG. 10 is a diagram illustrating the structure of a data transmission apparatus according to another embodiment.

FIG. 10 is a diagram illustrating the structure of a data transmission apparatus according to another embodiment. The apparatus may be configured in a second communication node. As shown in FIG. 10, the data transmission apparatus provided by the present embodiment includes a receiving module 94 and a determination module 95.

The receiving module 94 is configured to receive, on a second channel, a notification frame sent by a first communication node.

The notification frame is used for instructing the second communication node not to send data on the second channel.

The determination module 95 is configured to determine not to send data on the second channel according to the notification frame.

In an embodiment, the notification frame includes at least one of the following: the type of the notification frame, the identifier of a first channel, the sending duration of the first communication node on the first channel, or the sending moment of the first communication node on the first channel.

In an embodiment, the determination module 95 is specifically configured to, in response to the notification frame including the sending duration of the first communication node on the first channel, determine not to send data on the second channel within the duration according to the notification frame.

In an embodiment, the identifier of the first channel includes at least one of the following: the channel number, the central frequency point corresponding to the channel, or the link number.

In an embodiment, the second channel is such a channel among the channels of the first communication node that sending and receiving operations are not allowed to be performed on the first channel and the second channel simultaneously.

In an embodiment, the second communication node is a communication node associated with the first communication node and currently not operating on the first channel.

In an embodiment, the receiving module 94 is further configured to receive the first multi-channel capability parameter sent by the first communication node. The first multi-channel capability parameter includes at least the first frequency interval threshold.

In an embodiment, the first frequency interval threshold is used for indicating the minimum value of the absolute value of the difference between the central frequency points corresponding to such two channels among the channels of the first communication node that sending and receiving operations are allowed to be performed simultaneously on the two channels. Sending and receiving operations are not allowed to be performed simultaneously on such two channels among the channels of the first communication node that the absolute value of the difference between the central frequency points corresponding to the two channels is less than the first frequency interval threshold; and sending and receiving operations are allowed to be performed simultaneously on such two channels among the channels of the first communication node that the absolute value of the difference between the central frequency points corresponding to the two channels is greater than or equal to the first frequency interval threshold.

In an embodiment, the apparatus further includes a sending module configured to send the second multi-channel capability parameter to the first communication node. The second multi-channel capability parameter includes at least the second frequency interval threshold.

In an embodiment, the second frequency interval threshold is used for indicating the minimum value of the absolute value of the difference between the central frequency points corresponding to such two channels among the channels of the second communication node that sending and receiving operations are allowed to be performed simultaneously on the two channels. Sending and receiving operations are not allowed to be performed simultaneously on such two channels among the channels of the second communication node that the absolute value of the difference between the central frequency points corresponding to the two channels is less than the second frequency interval threshold; and sending and receiving operations are allowed to be performed simultaneously on such two channels among the channels of the second communication node that the absolute value of the difference between the central frequency points corresponding to the two channels is greater than or equal to the second frequency interval threshold.

The data transmission apparatus provided by the present embodiment is configured to perform the data transmission method in the embodiment shown in FIG. 7. The data transmission apparatus provided by the present embodiment has similar implementation principles and technical effects, which are not repeated here.

Figure 11:
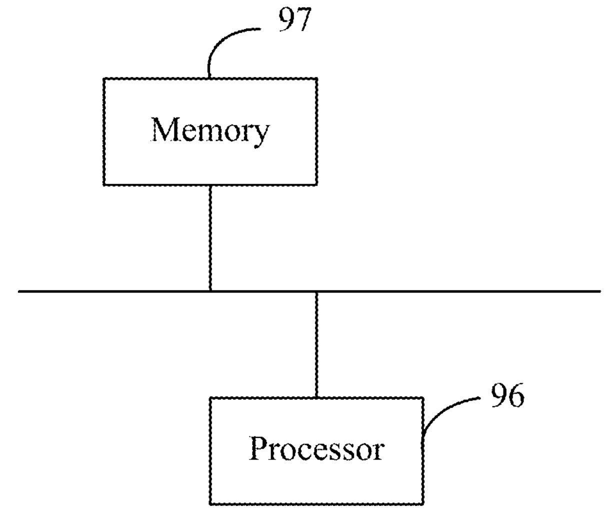
FIG. 11 is a diagram illustrating a structure of a data transmission apparatus according to another embodiment.

FIG. 11 is a diagram illustrating the structure of a data transmission apparatus according to another embodiment. As shown in FIG. 11, the data transmission apparatus includes a processor 96. Optionally, a memory 97 is further included. The data transmission apparatus may include one or more processors 96. One processor 96 is shown as an example in FIG. 11. The processor 96 and the memory 97 in the data transmission apparatus may be connected via a bus or in other manners. The connection via the bus is shown as an example in FIG. 11.

As a computer-readable storage medium, the memory 97 may be configured to store software programs and computer-executable programs and modules, such as the program instructions/modules corresponding to the data transmission methods in the embodiments of FIG. 4 and FIG. 7 (for example, the channel contention module 91, the acquisition module 92 and the sending module 93 in the data transmission apparatus or the receiving module 94 and the determination module 95 in the data transmission apparatus). The processor 96 runs the software programs, instructions and modules stored in the memory 97 to perform various function applications and data processing of the data transmission apparatus, that is, to perform the data transmission method in FIG. 4 and various optional embodiments or the data transmission method in FIG. 7 and various optional embodiments.

The memory 97 may mainly include a program storage region and a data storage region. The program storage region may store an operating system and an application program required by at least one function. The data storage region may store data created according to the use of the data transmission apparatus. Additionally, the memory 97 may include a high-speed random-access memory and may further include a non-volatile memory, for example, at least one magnetic disk memory and flash memory or other non-volatile solid-state memories.

The data transmission apparatus shown in FIG. 11 may be an access point or a station in the WLAN. When the data transmission apparatus serves as the access point or the station, the data transmission method in FIG. 4 and various optional embodiments is performed. When the data transmission apparatus serves as the station, the data transmission method in FIG. 7 and various optional embodiments is performed.

Embodiments of the present application further provide a storage medium including a computer-executable instruction. When executed by a computer processor, the computer-executable instruction is used for causing the computer processor to perform the data transmission method provided by any one of the embodiments of the present application.

The preceding are only exemplary embodiments of the present application and are not intended to limit the scope of the present application.

It is to be understood by those skilled in the art that the term user terminal covers any suitable type of wireless user device, for example, a mobile phone, a portable data processing apparatus, a portable web browser or a vehicle-mounted mobile station.

In general, multiple embodiments of the present application may be implemented in hardware or dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for the local technical environment and may be implemented by using any suitable data storage technology, such as, but not limited to, a read-only memory (ROM), a random access memory (RAM), an optical memory apparatus and system (digital video disc (DVD) or portable compact disc (CD)) or the like. The computer-readable medium may include a non-transitory storage medium. The data processor may be of any type suitable for the local technical environment, such as, but not limited to, a general purpose computer, a special purpose computer, a microprocessor, a digital signal processor (DSP), an application specific integrated circuit (ASIC), a field-programmable gate array (FPGA) and a processor based on a multi-core processor architecture.

What is claimed is:

1. A data transmission method, comprising:

sending, by a first communication node, a first multi-channel capability parameter to a second communication node, wherein the first multi-channel capability parameter comprises: a first frequency interval threshold and whether to support simultaneous multi-channel sending and receiving;

wherein the first frequency interval threshold is used to determine channels among the channels of the first communication node that sending and receiving operations are not allowed to be performed simultaneously, or channels among the channels of the first communication node that sending and receiving operations are allowed to be performed simultaneously;

wherein the first frequency interval threshold is further used for indicating a minimum value of an absolute value of a difference between central frequency points corresponding to such two channels among channels of the first communication node that sending and receiving operations are allowed to be performed on the two channels simultaneously;

wherein sending and receiving operations are not allowed to be performed simultaneously on such two channels among the channels of the first communication node that an absolute value of a difference between central frequency points corresponding to the two channels is less than the first frequency interval threshold; or, sending and receiving operations are allowed to be performed simultaneously on such two channels among the channels of the first communication node that an absolute value of a difference between central frequency points corresponding to the two channels is greater than or equal to the first frequency interval threshold;

wherein after sending, by the first communication node, the first multi-channel capability parameter to the second communication node, the method further comprising:

receiving, by the first communication node, a second multi-channel capability parameter sent by the second communication node, wherein the second multi-channel capability parameter comprises a second frequency interval threshold;

succeeding, by the first communication node, in channel contention on a first channel;

performing, by the first communication node, channel detection on a second channel within a preset duration before a sending moment of the first channel to acquire a detection result; and sending, by the first communication node, a notification frame to the second communication node on the second channel in response to the detection result being idle, wherein the notification frame is used for instructing the second communication node not to send data on the second channel; and wherein the notification frame comprises at least one of the following:

a type of the notification frame;

an identifier of the first channel;

a sending duration of the first communication node on the first channel; or a sending moment of the first communication node on the first channel;

wherein the identifier of the first channel comprises at least one of the following: a channel number, a central frequency point corresponding to the first channel, or a link number;

wherein the second frequency interval threshold is used for indicating a minimum value of an absolute value of a difference between central frequency points corresponding to such two channels among channels of the second communication node that sending and receiving operations are allowed to be performed on the two channels simultaneously; and wherein sending and receiving operations are not allowed to be performed simultaneously on such two channels among the channels of the second communication node that an absolute value of a difference between central frequency points corresponding to the two channels is less than the second frequency interval threshold; or sending and receiving operations are allowed to be performed simultaneously on such two channels among the channels of the second communication node that an absolute value of a difference between central frequency points corresponding to the two channels is greater than or equal to the second frequency interval threshold.

2. The method according to claim 1, wherein the second channel is such a channel among channels of the first communication node that sending and receiving operations are not allowed to be performed on the first channel and on the second channel simultaneously.

3. The method according to claim 1, wherein the second communication node is a communication node associated with the first communication node and currently not operating on the first channel.

4. The method according to claim 1, wherein sending, by the first communication node, the notification frame to the second communication node on the second channel comprises:

sending, by the first communication node, the notification frame to the second communication node on the second channel at a preset moment, wherein the preset moment is not later than the sending moment of the first channel.

5. The method according to claim 1, wherein performing, by the first communication node, the channel detection on the second channel within the preset duration before the sending moment of the first channel to acquire the detection result comprises:

determining that the detection result is idle in response to the first communication node determining that a result of signal intensity detection on the second channel within the preset duration before the sending moment of the first channel is idle and in response to a network allocation vector corresponding to the second channel being zero.

6. A data transmission apparatus, comprising a processor configured to perform the data transmission method according to claim 1 when executing a computer program.

7. A non-transitory computer-readable storage medium storing a computer program, wherein the computer program, when executed by a processor, causes the processor to perform the data transmission method according to claim 1.

8. A data transmission method, comprising:

receiving, by a second communication node, a first multi-channel capability parameter sent by a first communication node, wherein the first multi-channel capability parameter comprises: a first frequency interval threshold and whether to support simultaneous multi-channel sending and receiving; and determining, by the second communication node, channels among the channels of the first communication node that sending and receiving operations are not allowed to be performed simultaneously according to the first frequency interval threshold, or channels among the channels of the first communication node that sending and receiving operations are allowed to be performed simultaneously according to the first frequency interval threshold;

wherein the first frequency interval threshold is used for indicating a minimum value of an absolute value of a difference between central frequency points corresponding to such two channels among channels of the first communication node that sending and receiving operations are allowed to be performed on the two channels simultaneously;

wherein sending and receiving operations are not allowed to be performed simultaneously on such two channels among the channels of the first communication node that an absolute value of a difference between central frequency points corresponding to the two channels is less than the first frequency interval threshold; or, sending and receiving operations are allowed to be performed simultaneously on such two channels among the channels of the first communication node that an absolute value of a difference between central frequency points corresponding to the two channels is greater than or equal to the first frequency interval threshold;

wherein after receiving, by the second communication node, the first multi-channel capability parameter sent by the first communication node, the method further comprising:

sending, by the second communication node, a second multi-channel capability parameter to the first communication node, wherein the second multi-channel capability parameter comprises at least a second frequency interval threshold;

receiving, by the second communication node on a second channel, a notification frame sent by the first communication node, wherein the notification frame is used for instructing the second communication node not to send data on the second channel; and determining, by the second communication node according to the notification frame, not to send data on the second channel; and wherein the notification frame comprises at least one of the following:

a type of the notification frame;

an identifier of a first channel;

a sending duration of the first communication node on the first channel; or a sending moment of the first communication node on the first channel;

wherein the second frequency interval threshold is used for indicating a minimum value of an absolute value of a difference between central frequency points corresponding to such two channels among channels of the second communication node that sending and receiving operations are allowed to be performed on the two channels simultaneously; and wherein sending and receiving operations are not allowed to be performed simultaneously on such two channels among the channels of the second communication node that an absolute value of a difference between central frequency points corresponding to the two channels is less than the second frequency interval threshold; or sending and receiving operations are allowed to be performed simultaneously on such two channels among the channels of the second communication node that an absolute value of a difference between central frequency points corresponding to the two channels is greater than or equal to the second frequency interval threshold.

9. The method according to claim 8, wherein in response to the notification frame comprising the sending duration of the first communication node on the first channel, determining, by the second communication node according to the notification frame, not to send data on the second channel comprises:

determining, by the second communication node according to the notification frame, not to send data on the second channel within the duration.

10. The method according to claim 8, wherein the identifier of the first channel comprises at least one of the following: a channel number, a central frequency point corresponding to the first channel, or a link number.

11. A data transmission apparatus, comprising a processor configured to perform the data transmission method according to claim 8 when executing a computer program.

12. A non-transitory computer-readable storage medium storing a computer program, wherein the computer program, when executed by a processor, causes the processor to perform the data transmission method according to claim 8.

* * * * *